US011980962B2

(12) United States Patent
Busby

(10) Patent No.: US 11,980,962 B2
(45) Date of Patent: May 14, 2024

(54) ENERGY WELD WELDING CALCULATOR AND MONITORING SYSTEM AND DEVICE

(71) Applicant: Preston Busby, Utica, OH (US)

(72) Inventor: Preston Busby, Utica, OH (US)

( * ) Notice: Subject to any disclaimer, the term of this patent is extended or adjusted under 35 U.S.C. 154(b) by 794 days.

(21) Appl. No.: 16/952,143

(22) Filed: Nov. 19, 2020

(65) Prior Publication Data

US 2022/0152728 A1    May 19, 2022

(51) Int. Cl.
*G01D 5/26* (2006.01)
*B23K 11/25* (2006.01)
*B23K 37/00* (2006.01)

(52) U.S. Cl.
CPC .......... *B23K 11/258* (2013.01); *B23K 11/253* (2013.01); *B23K 11/257* (2013.01); *B23K 37/006* (2013.01); *G01D 5/264* (2013.01)

(58) Field of Classification Search
CPC   G06T 7/0004; G06T 1/20; G06T 1/60; G06T 2207/30108; G05B 2219/35216; G05B 2219/37205; G05B 2219/37439; G05B 19/4097; G05B 19/401

See application file for complete search history.

(56) References Cited

U.S. PATENT DOCUMENTS

| | | | | |
|---|---|---|---|---|
| 6,070,106 A | * | 5/2000 | Hall | G05G 11/00 700/95 |
| 2003/0007544 A1 | * | 1/2003 | Chang | F24C 7/08 374/149 |
| 2008/0276477 A1 | * | 11/2008 | Albrecht | G01B 3/1003 33/771 |
| 2013/0256385 A1 | * | 10/2013 | Sugito | H01L 24/85 228/10 |
| 2015/0185259 A1 | * | 7/2015 | Axelsson | G01R 21/133 324/140 R |
| 2016/0125592 A1 | * | 5/2016 | Becker | B23K 9/322 348/90 |
| 2016/0214198 A1 | * | 7/2016 | Hsu | G01C 25/00 |
| 2016/0267806 A1 | * | 9/2016 | Hsu | B23K 9/32 |
| 2018/0330605 A1 | * | 11/2018 | Ikeler | G08C 23/04 |
| 2021/0138572 A1 | * | 5/2021 | Taig | B23K 9/125 |

* cited by examiner

*Primary Examiner* — Santosh R Poudel
(74) *Attorney, Agent, or Firm* — Jeffrey M. Furr, Esq.; Furr Law Firm

(57) ABSTRACT

The current invention is a system and application that provides key insight into the technological processes that encompass a welding calculator apparatus consisting of a calculator casing, an optical rotary encoder in the calculator casing for providing weld length data, a time counter in the calculator casing for providing weld time data and a microcontroller device in the calculator casing for processing weld length data and weld time data, weld travel speed data and heat input data.

2 Claims, 6 Drawing Sheets

Inside View of the back of the case

Figure 1 Inside View of the back of the case

Figure 2 Front and Top View

Figure 3 Rear View

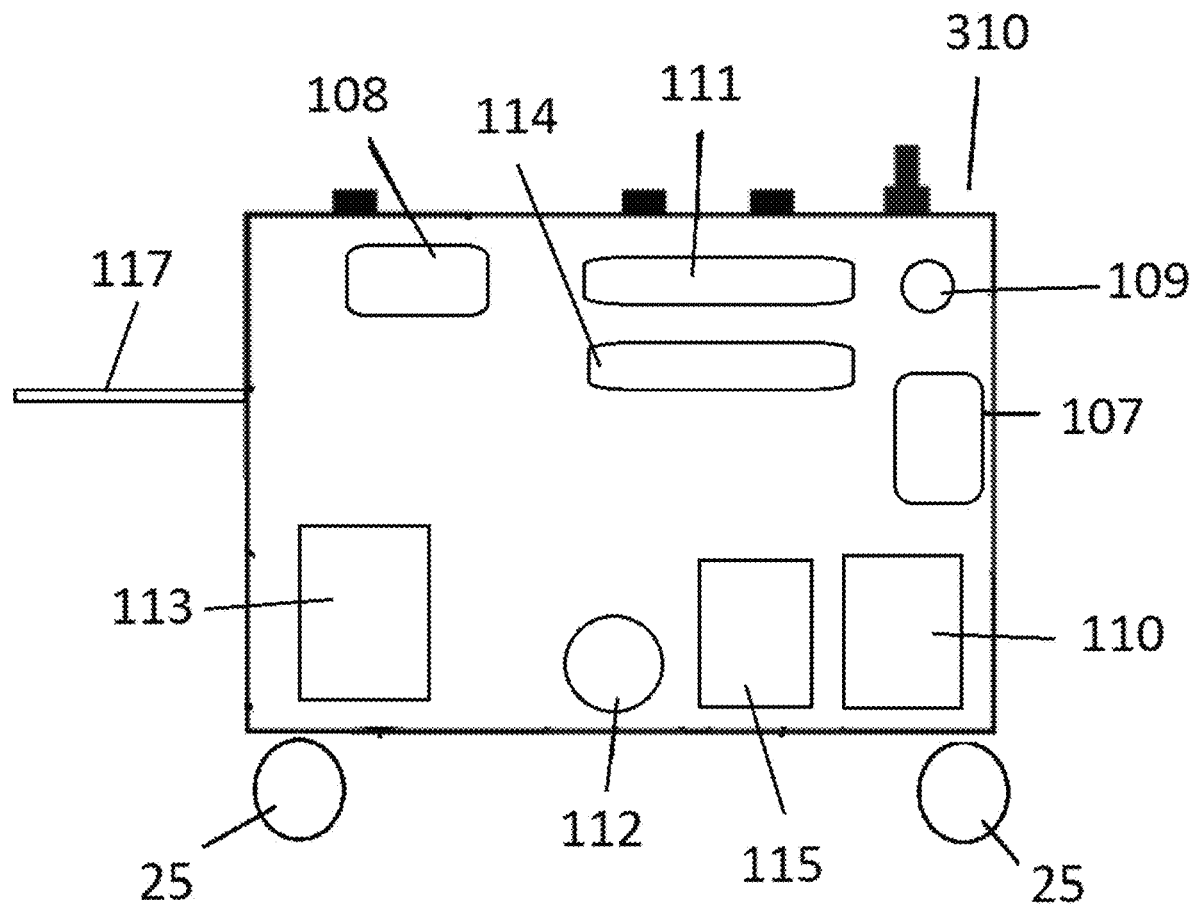
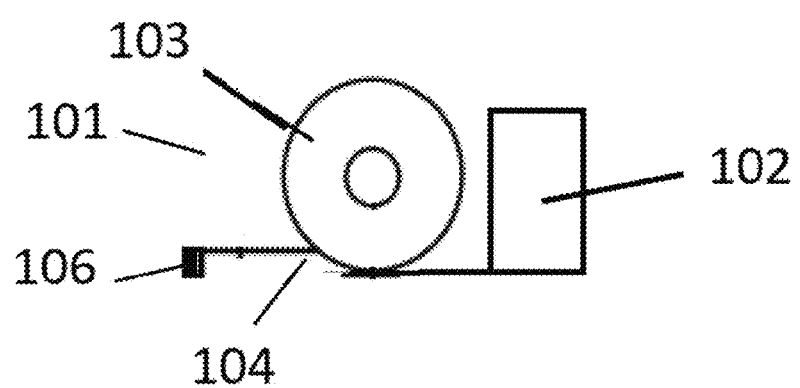
Fig. 5

ENERGY WELD WELDING CALCULATOR AND MONITORING SYSTEM AND DEVICE

CROSS-REFERENCES TO RELATED APPLICATIONS (IF ANY)

The current application is a non-provisional and claims the priority date of provisional application 63/001,598 filed on Mar. 30, 2020 which is incorporated by reference.

FEDERALLY SPONSORED OR GOV PROJECT

None

BACKGROUND

1. Field of the Invention

The current invention is a system and application that accumulates welding related data in real-time.

2. Description of Prior Art

Previous welding monitoring systems that have been made commercially available have major disadvantages, with size, pricing limited functionality being the two most notable disadvantages.

The sizes of these units are very impractical for small welding shops and independent welding on a small scale (for example: independent contractor for small repairs, land lay pipeline projects in the elements). The cost of these units has been proven to be crippling to the owners of the shops and the independent contractors, so they avoid using them, and the losses as a result, mount.

The previous systems that have been made for this process also do not have the ability to calculate the travel speed manually and independently. This is exactly what the welding industry needs but those same industry participants are limited to ownership due to large barrier of entry surrounding the size and cost of the current units. In addition and in closing, current welding monitoring systems do not have any way to test their travel speed and heat input accuracy without having a technician on site, which in turn, leads to additional problems because these welding machines could weld for hours before a problem is found.

There is still room for improvement in the art.

SUMMARY OF THE INVENTION

Due to increasing regulation on the welding processes, monitoring of the process is becoming a necessity. Welding monitoring systems ensure the quality of the company's product as well as to help discover a negligent weld and track it back to a potentially liable party. These systems also ensure a quality product and weld because of the recording and analytic capabilities that document the results will be able to outline if all required specifications are met.

In commercial environments, companies typically require their employees to monitor and calculate the travel speed and the heat input of the weld manually. And this is a tedious and timely process. Here is how "monitoring systems" typically work:

a. For a person to calculate the travel speed of a weld, they must record the total duration of each weld pass then measure the length of each weld pass.
b. The resulting travel speed would be calculated by dividing the recorded length by the recorded time.
c. Then a person must record the average amperes and volts of each weld pass to calculate the heat input. (Heat Input is a term for energy that goes into the weld and not actual temperature.)
d. The heat input is calculated by multiplying the voltage by amperage, then dividing the result by the calculated travel speed for each pass.
e. Record the data.

This lengthy process has many disadvantages but two of the most obvious ones are time and money. If the personal monitoring the weld takes a long time to calculate the travel speed and heat input, the whole weld can be delayed causing a loss of man hours and delays in product delivery. The second obvious disadvantage is the cost.

As an example, if the person monitoring the welding takes an erroneous reading by mistake, they run the risk of having an unacceptable travel speed and heat input which is paramount to the weld. If not correct, the result will typically end up with the weld being rejected which could, in turn, end up being a very large loss in profits from material and labor cost.

The verdict? Having human involvement in this welding and monitoring process increases the chance of error in the calculations of the travel speed and heat input.

To solve this the current invention is a system and application that provides key insight into the technological processes that encompass a welding calculator apparatus consisting of a calculator casing, an optical rotary encoder in the calculator casing for providing weld length data, a time counter in the calculator casing for providing weld time data and a microcontroller device in the calculator casing for processing weld length data and weld time data, weld travel speed data and heat input data

BRIEF DESCRIPTION OF THE DRAWINGS

Without restricting the full scope of this invention, the preferred form of this invention is illustrated in the following drawings:

FIG. 5 shows additional embodiments to the current invention; and

DESCRIPTION OF THE PREFERRED EMBODIMENT

Figure 1:
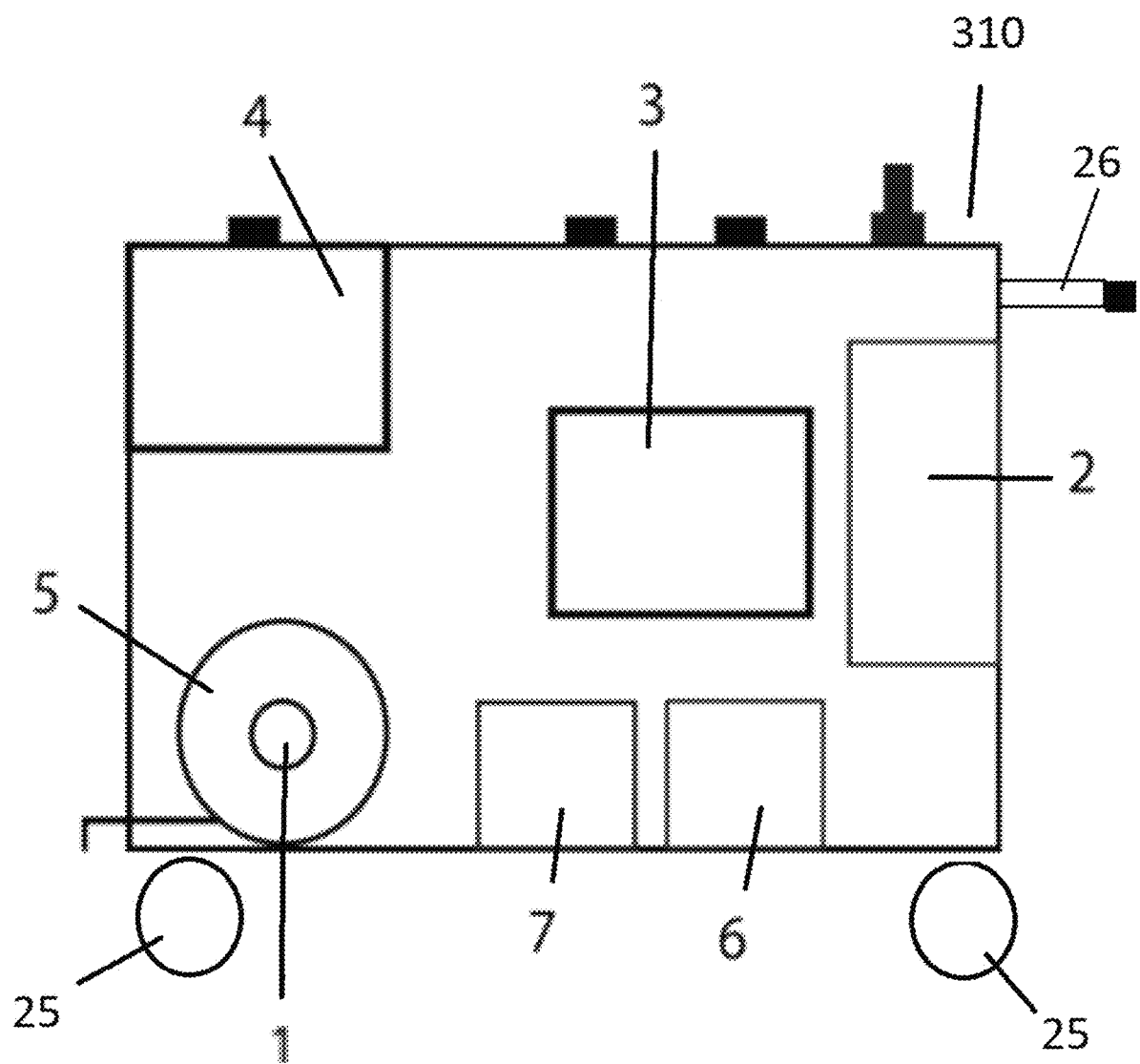
FIG. 1 is the top view of the inside back of the current invention's case which contains an optical rotary encoder a tape measure that attaches to the optical rotary encoder, battery, microcontroller, SD card reader and writer module, the Bluetooth module, and Wi-Fi module.

There are several significant design features and improvements incorporated within the invention.

As shown in FIGS. 1 through 6, the current invention is a system, device 310 and application (app) 600 that consists of a welding calculator that consists of an OLED screen, time counter, optical rotary encoder, voltage meter, split core amperage meter and a microcontroller.

The counter is part of the microcontroller 3 and is programed to record the amount of time from beginning to end of a weld pass. The calculator has two ways to start and stop the time counter, the first way the user manually starts and stops the counter and the second way the counter is dependent on the current sensor. The manual way has one button for the counter, one to start and stop the timer. The second way starts the count when the microcontroller 3 senses steady current is flowing through the amperage meter and stops the count when no current is flowing. The time value is displayed on the OLED screen 17 the entire time. The voltage meter records the amount of voltage measured from welding machine when the counter begins counting.

The microcontroller 3 uses the voltage divider rule with resistors to calculate the input voltage from the machine. This protects the circuit from over voltage damage. The Instantaneous and average voltage is displayed on the OLED screen 17 for the user to see.

The microcontroller 3 can also be an ARM based CPU that operates a Linux, Android, or IOS device. The microcontroller be connected to electronic memory in the preferred embodiment. This can be internal memory within the microcontroller or a SIM card or external memory.

An e-ink, STN or FSTN, display with or without back light can also be used instead of an OLED screen 17.

The device 310 can measure negative and positive in either polarity the probes are connect in. if the user connects the positive voltage probe to the positive terminal and negative voltage probe to the negative terminal then the voltage displayed on the screen would show a positive value. If a user connects the positive voltage probe to the negative terminal and negative voltage probe to the positive terminal, then the voltage displayed on the screen would show a negative value. The device 310 allows the user to take the absolute value of either negative reading or positive to calculate the Heat input, so it will not show as a negative value if the polarity were reversed.

The device 310 allows the user to take the absolute value of any of the negative readings to calculate the Heat input, so it will not show as a negative value if the polarity were reversed. The device 310 allows the user to take the absolute value of the negative readings and display it on the screen so it will be positive displayed and saved values that are not dependent on voltage polarity.

Once the time counter stops counting the average voltage is saved for later use. Similarly, the instantaneous and average amperage is displayed on the OLED screen when the timer begins counting. The device 310 records samples of the measured voltage and amperage then they are averaged at a user specific frequency. The sampling rate can be altered manually or automatically after the user uploads the welding procedure specification into the device 310. The average amperage is then saved for later use when the timer stops counting.

The optical rotary encoder 1 has a small wheel or measuring tape 5 connected to the shaft. The optical encoder 1 uses a photo detector that can sense when the shaft is rotated. The output signal of the rotary is then mapped to a length. This allows the microcontroller 3 to calculate the length by using the distance the optical encoder's shaft spins to be converted to a length measurement and it is then displayed on the OLED screen 17.

Once the user has the length measurement, they then can press the reset button 10 which sets the length value to zero for the next reading. Once the microcontroller 3 has the length and time, it can calculate the travel speed in any preferred units. The travel speed is calculated from the following equation:

$$\text{Travel Speed} = \frac{\text{Length}}{\text{Time}} \times 60$$

The value is then displayed on the screen and or sent wirelessly to a remote display. The user could then record the value for manual calculations, save to memory for further calculations, and or a remote storage location such as a cloud-based server wirelessly or with cable if the user does not need to calculate the heat input.

The Heat input can be calculated using the recorded Travel Speed, Voltage and Amperage values. Heat input is a term for energy that goes into the weld and not actual temperature. The device 310 is programmed to take these values and use them in the following equation:

$$\text{Heat Input} = \frac{\text{Amps} * \text{Volts} * 0.06}{\text{Travel Speed}}$$

The calculator has an option to edit measured values just in case there was an error taking the reading. There is a three-position toggle switch 16, increment and decrement buttons on the front face plate. The three-position toggle switch 16 has two positions to edit time and length values a position to view saved memory values. If there was an error in the recorded time value, the user could switch the toggle to the time position and use the increment push button 14 and decrement push button 15 to edit it.

For the length position, the user would switch the editing toggle switch 16 to length and use the same two push buttons on face plate to increment or decrement the value. If no editing is needed and the user would like to view the values saved in memory, the three-position toggle switch 16 can be switch to the memory position to be able to cycle through it with the increment and decrement button. The device 310 would allow the user to select English or metric units or various other forms used for measuring.

FIG. 1 illustrates the current invention's versatile handheld welding calculator system's back casing that illustrates the inside of the unit. An optical rotary encoder module 1 transfers amount the shaft spins to an electrical output. A battery 2 supplies power to the unit. A microcontroller 3 calculates the time, length, and travel speed from the inputs of the user of the invention. A SD card module 4 is where the calculated and measured data is saved to. A tape measure 5 is coiled around the optical encoder module's shaft so when the tape is pulled out, it spins the shaft. A Bluetooth module 6 is used to send calculated and measured data to another Bluetooth capable device. It can also be used to control the device 310 remotely. A Wi-Fi module 7 that is used to send calculated and measured data to another Wi-Fi capable device through a wireless network 100 such as the Internet. It can also be used to control the device 310 remotely.

Figure 2:
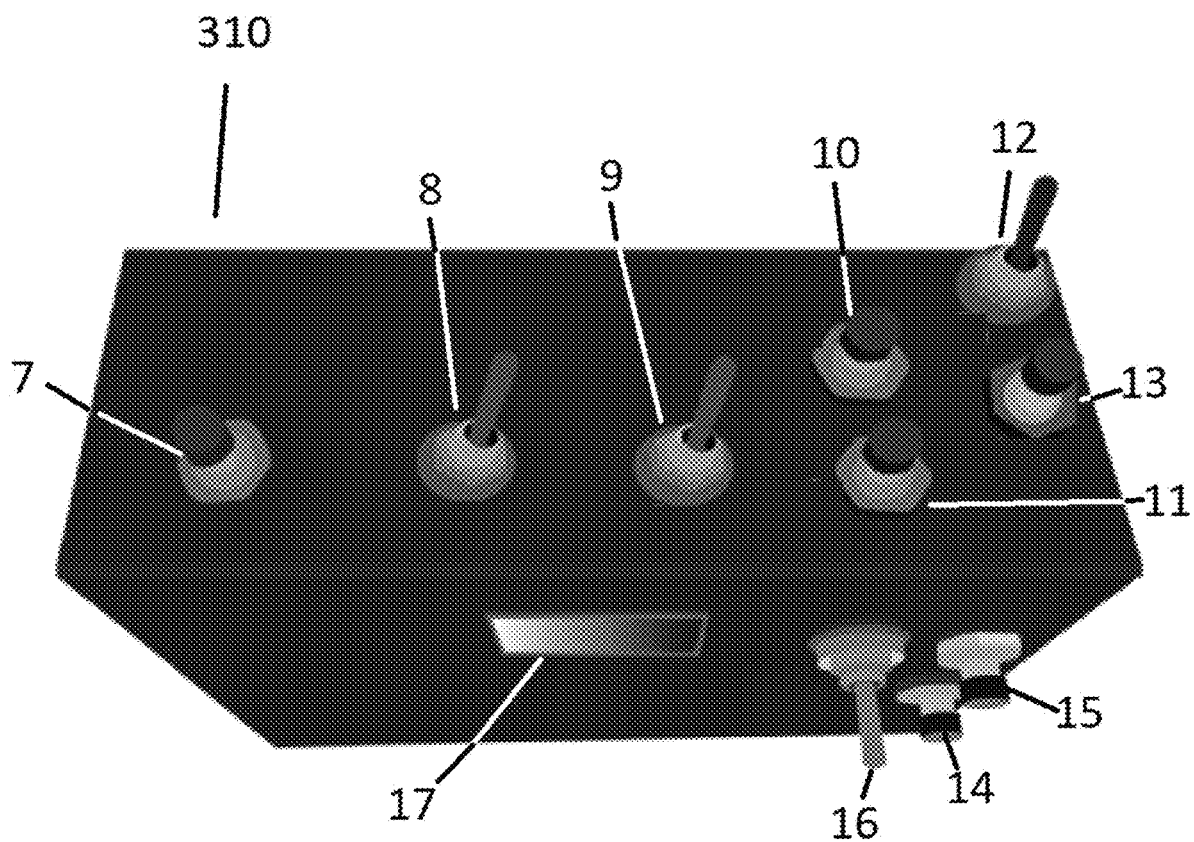
FIG. 2 is Front and Top View of the current invention that shows an OLED screen, four three position toggle switches and six push-button switches.

FIG. 2 illustrates the current invention's membrane type buttons could be used as well as other technologies to make the device 310 more robust and ergonomic. Save display value push button 13; it is pressed when an end user approves and wants to save the values to memory through the current device 310. The user will be presented with the option of using the measuring tape 5 or the encoder wheel to measure length. An encoder select switch 8 controls the ground wires to the optical rotary encoder module 1 so the end user can turn off power to the one that is not being used. A toggle switch 9 allows the end user to switch to the preferred method of controlling the timer. They can select for the amperage meter to control the time counter or select for the timer to be started manually. A reset push button 10 clears the device's displayed data from a previous weld job. A Start/Stop counter button 11 which is pressed when the end user wants to start and stop the time counter. The alternative embodiment design provides the option of allowing the end user to only calculate the travel speed if they are unable to use or chose not to use the amperage meter and voltage meter to calculate the heat input. These also provide a means for the end user to select English or metric units for measurements and calculations. An on/off two position toggle switch 12 turns the entire unit on or off. A Length Value Capture push button 13 is pressed and held until the end user measures the length with the device's measuring tape 5. Once this is released, the recorded value does not change when the tape is retracted into the casing, allowing the end user to save the data without having to risk losing that same data. There is an increment push button 14 and decrement push button 15 that allow the end user to increment or decrement through the saved memory values when the Memory/Editing toggle is in the first position and increment or decrement the length and time values when the user has the memory/Editing toggle switch 16 in the editing positions. The Memory/Editing toggle switch 16 allows the user to view memory in the first position and edit time or length in the other two positions. An OLED display 17 that shows the measured and calculated data.

Figure 3:
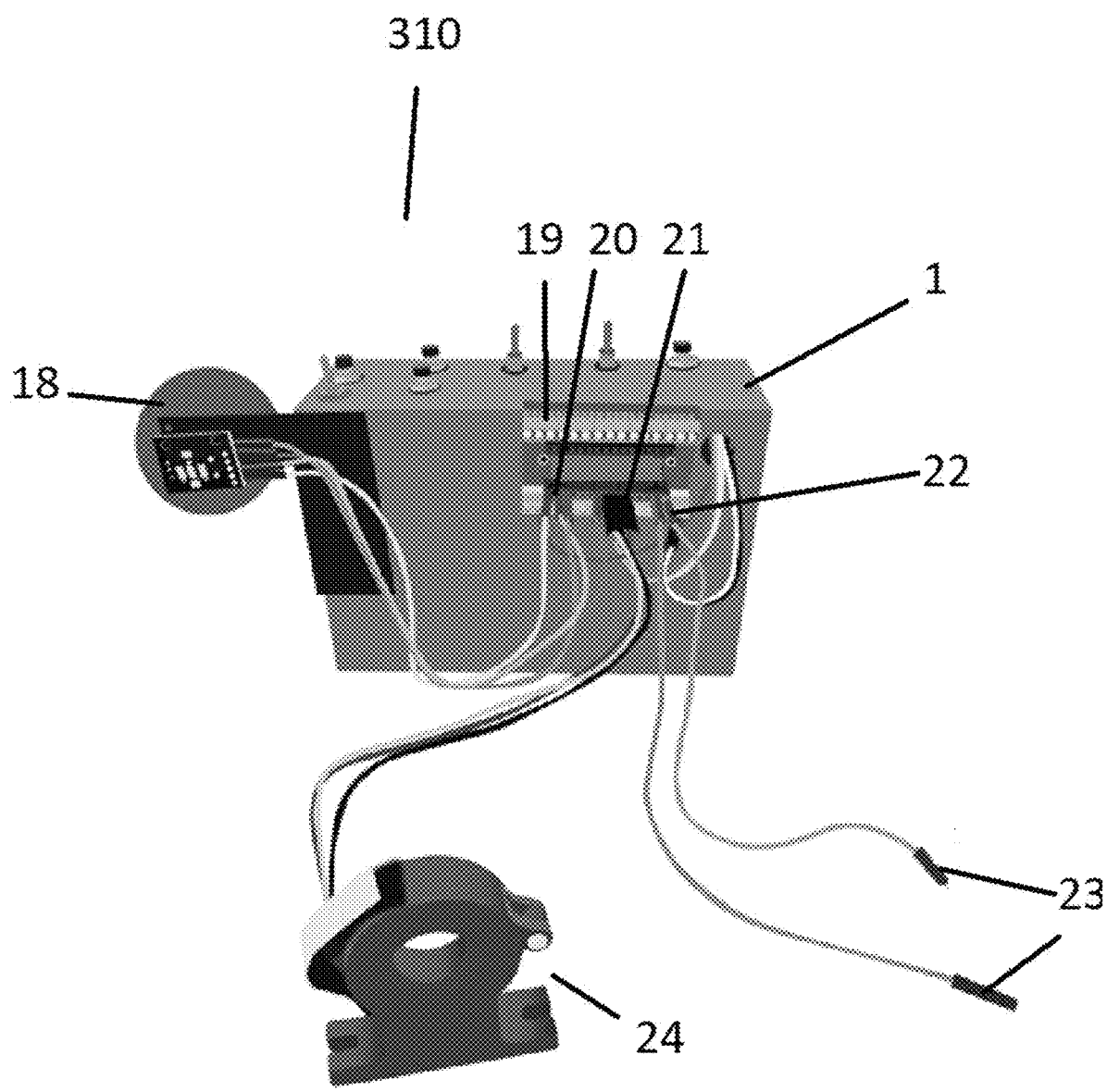
FIG. 3 is the rear view of the current invention which contains an optical rotary encoder, measuring wheel that attaches to the optical rotary encoder, a hall effect current sensor, voltage probs and a bus bar that connects the encoder, current sensor and voltage probs to the microcontroller/processor inside the device.

FIG. 3 illustrates the device's rear view of the case. An Attachable Wheel optical rotary encoder 18 measures length with a rolling wheel. It can be attached and detached depending on the how the user would like to take measurements. The current invention has optical rotary encoder power wire quick attachment plugs 20. There are also split core hall effect amperage meter quick attachment plugs 21 and voltage meter probes quick attachment plugs 22 for the voltage meter probs 23 such as an HST(S) Split core hall effect core non-invasive current meter 24. The amperage meter 24 and voltage meter probes 23 can quickly be connected and disconnected. This allows the end user to manually measure the weld length after the welding has stopped so the device 310 will be able to finish its calculations for the travel speed and heat input.

In another embodiment, the device 310 will have a Bluetooth or Wi-Fi tape measure, multimeter and an application 600 for computers and mobile devices. This embodiment will work the same while allowing more freedom and versatility. A user would connect a Hall Effect clamp multimeter to welding machine and it would measure and record the amperage and voltage simultaneously during welding.

Additionally, and in concurrence to the aforementioned welding process, the Hall Effect clamp meter will be transmitting the measured and recorded data to the mobile application 600 wirelessly. When a device welder begins welding, the clamp hall effect multimeter detects the current and the multimeter begins recording the time duration of the weld pass. Once the weld pass is completed, the user would measure the length of the weld pass and then the measuring tape 5 would simultaneously send the data wirelessly to the mobile application 600 and save to its internal memory. Once the mobile application 600 has the voltage and amperage from the Hall Effect clamp meter and the length from the digital measuring tape, it will then calculate the travel speed and heat input in the mobile application 600. The data from this pass would then be stored to the device running the application or sent wirelessly through Bluetooth, Wi-Fi, satellite, or cable to a cloud service or to another mobile device.

The measuring tape 5 consists of a digital tape measure and a built-in time counter, microprocessor, Wi-Fi, Bluetooth, digital display, and a cable option. The digital tape measure would allow the user to start and stop the time count to measure the duration of the weld time. The user would then measure the weld to record weld length that automatically reads the length with internal photo interrupt sensors or optical rotary encoders. The measuring tape 5 would then calculate the travel speed of the measured time and length to save to memory or send to the mobile device. The measuring tape 5 would allow travel speed calculation to be calculated and recorded independently. The measuring tape 5 will display the calculated travel speed on the display. The device 310 would give the user the option to monitor the voltage, amperage during welding. Once the weld pass is complete, the measuring tape display will show the heat input of the weld.

In another embodiment, the device 310 could have a GPS system.

Operation

The following explains the steps that are performed during the welding process using the device 310 with reference to FIGS. 1, 2, 3, 4 and 5 above.

Once the on/off toggle 12 in FIG. 2 is selected to on, the entire unit can work. The on/off toggle switch 12 is connected to the battery 2 in FIG. 1 and supplies power to all the components in FIGS. 1, 2, 3, 4 and 5 when it is in the on position. As an alternative embodiment, the device 310 can also be plugged into an external power supply.

After the amperage meter 24 and voltage probes 23 are connected to the welding machine, the user will need to select which way the timer will be dependent on. The end user would use the timer select toggle to switch to manual timer or automatic timer. If the user choses manual, the user would manually press the start/stop push button 11 to start the timer when the weld starts and presses it immediately after the welding process stops. If the user selects automatic timer, the timer will automatically start and stop depending on current flow. While the welding is process and the timer is recording the welding duration, the instantaneous voltage, amperage, and time is displayed on the OLED screen 17. After the welding stops, the average voltage, average amperage, and weld duration are displayed on the OLED screen 17 or an external screen. The user then will be prompted to measure length the of the weld pass. The user would then decide which way they would like to measure the length with the encoder select toggle 8. If the end user selects the attachable optical rotary encoder wheel 18, the end user would place the attachable optical rotary encoder wheel 18 at the beginning of the weld and roll it the entire length of the weld. If the end user selects the internal measuring tape optical rotary encoder 1, the end user would place the tip of the tape measure 5 on the beginning of the weld and draw it out until the entire length of the weld pass is measured. When the length of the weld pass is measured the end user would then press the length capture push button 13. The optical rotary encoder module 1 would transfer the rotation of the encoder's shaft spun to an electrical signal that is then sent to the microcontroller 3. The microcontroller 3 would then take that electrical signal and map it to a length. The user then will be able to edit the time and length because of the device 310. This is done by switching the Memory/Editing toggle switch 16 to the measurement that needs editing and use the Increment push-button 14 or the Decrement pushbutton 15 to change the values. Once this is complete, the device 310 would calculate the travel speed and heat input of the weld with the formulas that were discussed previously. This information would then be displayed on the OLED screen 17. Once the values are approved, the end user would press the save push-button 7 and the values would be saved to the SD card 4 and or sent to a remote location through the Bluetooth module 6 or through the Wi-Fi module 7. The average voltage and current, time and length values are displayed on the OLED screen 17 until the reset push button switch 10 is pressed clearing all the displayed data. The device 310 is ready for the next welding measurement after the reset is pressed.

It is important to note that the device 310 allows the user to upload multiple procedures and qualified welder matrixes for each procedure into the device's memory through Bluetooth, Wi-Fi, SD card or cable for later use. The user will select a previously uploaded welding procedure specification from memory and the device 310 will automatically set the ranges for the amperage, voltage, travel speed, length, and heat input. The device 310 will warn the user if the limits of the welding procedure specification are not being followed while the weld is in progress. The device 310 would then also allow the user to input multiple welding procedure specifications and multiple welder matrix data. The device 310 automatically highlights the user which welders are qualified to perform on a specific procedure and will alert the user if an unqualified welder attempts to weld a specific pass. When the welding begins, the device 310 will check each past that electronically store prequalified procedure of other welding specification and or codes that would qualify the welder for other procedures. This would allow the welder to take one test and be qualified for multiple procedures without the need to perform a welding test for each one. This would decrease the financial strain the company, quality control and the weld endure.

Continuing, in the case that travel speed is the only calculation needed, the user would only need to record the duration and length of the weld. The device 310 could use the current sensor 24 to activate the timer automatically when there is current flow or start the timer manually as stated in the previous steps. The user would then measure the length of the weld after the weld pass. Thus, the travel speed is calculated, displayed on the OLED screen 17, saved to the SD card 4 and or sent through Bluetooth or Wi-Fi to another device or computing device 200.

The device 310 also allows the user to pause and continue the recording of the welding process. If the Start/Stop push button 11 is pressed, the average amperage and voltage as well as the timer is stopped. If the Start/Stop push button 11 is pressed again, the process is continued from where it previously stopped recording. The same goes for the automatic timer using the current flow of the welding machine to start, pause, continue and stop the timer depending on the amperage.

The current invention will allow the user to upload the parameters of each weld pass from the welding specification to an SD memory card and or shall be sent to a stand-alone memory device via Bluetooth.

The current invention automatically selects welding pass parameter, or these welding pass parameters can be pre-set by an end user.

The current invention automatically categorizes weld passes by the measured and calculated measurements in sequential order.

The current invention automatically highlights parameters that do not comply with the previously uploaded parameters of the pass. For example, if welding pass's Amps, Volts, travel speed or heat input are out of the required range, the user is alerted, and the pass is paused.

The current invention can automatically switch to the next pass once a previous predetermined pass is completed. It is important to note that the unit will only allow the switching of passes if the length reaches a threshold. For example, if the length of the weld measured is the circumference of the pipe after a weld pass, then the device 310 would know that the weld pass was completed, and it can switch to the next pass.

The current invention allows lengths to be manually entered by an end user and set to a specific number if the user is not required to measure the length of each pass. For example, if the user isn't required to measure each pass, the device 310 would allow the user to input a diameter of the pipe and it would automatically calculate the circumference or the user could input the circumference and it will save the circumference and use the value for each pass.

The current invention allows the user to enter the diameter and thickness of the welding material as well as the thickness addition of each welding pass so it could adjust the circumference length of each weld pass automatically.

As an implied example, if the outer diameter of the pipe is 200 mm, the wall thickness of the pipe is 20 mm and each weld pass would increase the inner diameter of the pipe by 5 mm. The inner diameter of the pipe then would be 160 mm so after the first weld pass, the diameter of the weld would be 170 mm. the following chart shows the circumference increase of each welding pass until the weld reaches the outer diameter value of the welded material.

|  | Diameter (mm) | Circumference (mm) |
| --- | --- | --- |
| Inner | 160 | 502.4 |
| Pass 1 | 170 | 533.8 |
| Pass 2 | 180 | 565.2 |
| Pass 3 | 190 | 596.6 |
| Pass 4 | 200 | 628 |

The user can input these values and the device 310 would increment the length values automatically if the user chooses not to measure each welding pass with the measuring tape 5 or encoder wheel 18.

The current invention automatically can correlate the pass deposition to the time it takes for the weld pass to be completed. For example, if the shortest time of the weld pass completion is 7 minutes with a deposition diameter amount of 5 mm and maximum weld pass time of completion is 8 minutes with a weld diameter deposition of 6 mm then if the weld pass completion is 7.5 minutes, the device 310 would know that the welder deposited 5.5 mm diameter of material in the weld. The device 310 would calculate this automatically.

The current invention can be set, or programmed, to allow the monitoring of two welders at the same time by allowing the device 310 to handle two different amp and volt meters through hard wire connection or Bluetooth connections. Also, the device 310 would need to have two different timers to allow the user to record multiple welders if necessary. The device 310 would only need to calculate the travel speed and heat input for the additional welder.

The current invention allows the user to download the information from the device 310 to a common file for reviewing. The data is formulated in, for example, an excel file or any format that will use a common program that the average person would already have on their device. This is beneficial because said users would not need to purchase additional software to use it.

The current invention allows the device 310 to check the resistance of an entire welding system so it can calculate the voltage without invasively checking the wires with the voltage probes as it is performed in the field.

The current invention allows the user to manually set a voltage requirement in the device 310. The device 310 allows a range of voltage and once it knows the resistance and amperage, it can monitor the voltage range to ensure that the voltage range is within the required range without having to invasively penetrate the welding leads. The device 310 allows the user to input voltage manually without it being dependent on the resistance of the system.

The Membrane buttons allow the device 310 to be more resilient to continuous use, harsh climates, and water resistant.

Figure 4:
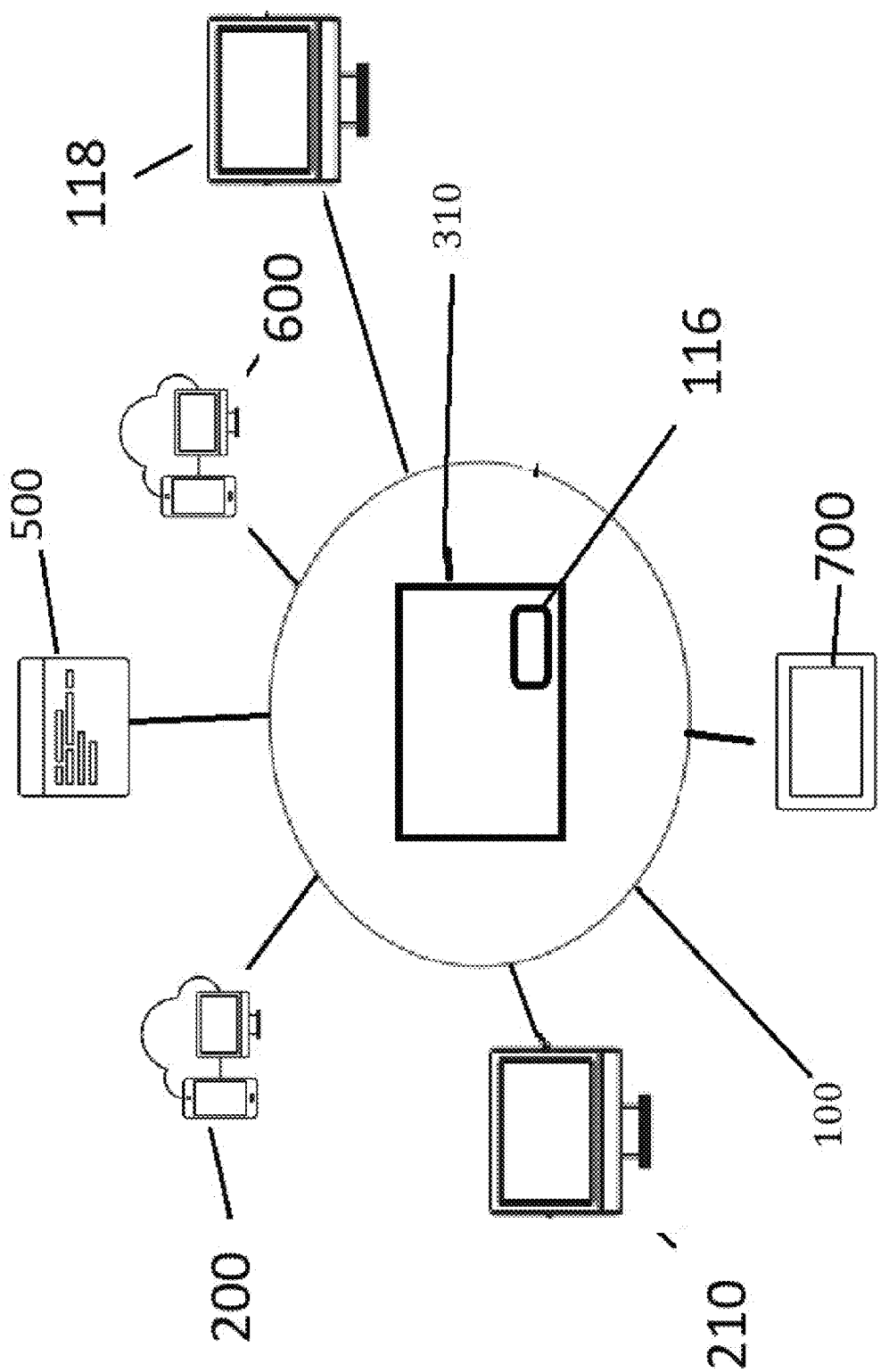
FIG. 4 shows the current invention connecting to other devices.
Figure 6:
FIG. 6 shows a screen shot of a potential computer or mobile software application.

The Bluetooth Module 6 allows devices with Bluetooth capabilities to connect to the device 310 as shown in FIG. 4. A mobile application 600 could be designed and used to control the device 310 or view the measured and calculated data. Artificial Intelligence ("AI") based technology or other advanced (algorithms) could also be used for video based object detection, data classification and or automatic measurement and control, as wells as provide data for deep learning ability allowing the device 310 to send data to personnel or other equipment automatically that it is connected to. The device 310 could also receive information from other welding equipment that has Bluetooth capabilities, and the "AI" technology could review the information obtained and use it for calculations.

The WIFI module for connecting to a network and/or remote server/cloud hosted site for live/real-time viewing addition as shown in FIG. 4. This option to add a WIFI module that will send weld data to device 310 that is connected to the router network or remote server/cloud hosted site. The WIFI or broadband cellular module would allow the user to monitor live/real-time or prerecorded data at any given time. The time of the weld could be recorded from the upload time and allow production team to estimate future daily work goals and project completion goals more accurately. Also, this addition would benefit users because they could "connect" to a remote server or database that they would control.

The preferred embodiment would have a Mobile application 600. This application addition would allow the end user to monitor or completely control the processes from mobile devices or personal computers. The user would be able to connect the mobile device 200 or personal computer to the device 310 with the device's Bluetooth module 6 or WIFI module to be able to control and view the values the device 310 is measuring and calculating on the device 310. The user of the device 310 would have the option of using the input features on the device 310 or the application to control the device. It would be able to record the measured and calculated values from the device 310 on the application's memory. With the inherent deep learning abilities of the "AI" component, the data can be analyzed and used for controlling the device automatically.

ALTERNATIVE EMBODIMENTS

An Embedded or Attachable volt meter with retractable cords for the amp meter and voltage probes 23 will be able to add an attachable piece to the device 310 for the amperage meter and voltage probes that would allow the end user to quickly attach and detach from the main unit whenever he or she needed to take a measurement. This represents a more efficient way to connect the amp meter and voltage probes to the unit instead of connecting them individually.

Retractable Cords would make an end users job more convenient and allow for faster storage of data after the weld is completed.

Attachable/detachable amp/voltmeter with retractable cords for the amp meter and voltage probes as well as has Bluetooth capabilities. Either embedded or optional, this attachable piece for the amperage meter and voltage probes will allow end users the ability to quickly attach and detach from the main unit whenever needed to take a measurement that has already had Bluetooth pairing capabilities enabled. The unit would send data to main unit via Bluetooth, Wi-Fi, or other radio frequencies such as 900 Mhz, as an example, so it would not require to be manually connected if the end user choses. The end user would be able to calculate the heat input when pairing the device 310 to the device's Bluetooth, so it can transmit the measured voltage and amperage. The Bluetooth or other RF module of the main unit would have to be able to be connected simultaneously to the voltage/amperage meter device's Bluetooth as well as the user's phone's Bluetooth or Wi-Fi, so the end user could use the mobile application 600 if available.

Having a Broadband communications and Mobile sim card slot. This option would allow for end users to utilize an embedded broadband communication or a mobile sim card slot module that will allow the finished weld data to be sent to $3^{rd}$ parties through broadband cellular, Wi-Fi or via a text messaging. The benefit of this is that it will allow the end user to conduct other tasks at the same time to be productive. The end user could also analyze and prioritize the data and, for example, only send what it predicts is necessary to prevent and reduce network charges.

A camera added to the device would allow for $3^{rd}$ party monitoring of end users while, for example, weld while measurements are being taken. The camera can work for live/real-time viewing through a WIFI or broadband connection or it can store the data to memory of the device or the SD card 4 for later reference and review. This will allow proof that the measurements and calculations were valid which happens to be a priority in the field. The camera could be setup with a pre-record function to buffer a defined amount of time to show what happened before and during the welding process, post record settings could be set as well to continue recording a pre-defined time after the stop command has been sent to see what followed after, this may be helpful when trying to determine errors, damage or injuries. The camera apparatus could be set up for facial recognition to lock or unlock the device to prevent unauthorized personnel from using it. This apparatus can be set up to alert the company when unauthorized personnel are trying to use it and could use the facial reconnection to prevent unauthorized use. The apparatus can also record information about the user to a profile, it could be used, for example, to log hours the employee worked for payroll and billing. It could also provide proof that an employee is at work. The camera data then can be sent or stored depending on the user's preference. For example, track the material being welded and automatically store the information for traceability, billing and automatically schedule replacement of the material.

A temperature meter can be added to the device 310 to show that the weld has met the preheat requirements and the welder can start or continue with a welding process. The device 310 can record and save the temperature values to memory for later reference and review. Separate (red, green, yellow) LED indicator lights can also be used to show that the weld's approximate preheat values. The Green light will show that the required preheat is met, the yellow will show the preheat is below a required value and the red will show that the value is below the required value. The values associated to each light can be set in the device 310 with the buttons on the device 310 or with another device wirelessly or with a cable. The previously embedded "AI" deep learning technology could then help the user analyze data from the thermometer. The device 310 could calculate the optimal pre heat temperature the material would need to be to keep the temperature in the required range during the entire welding process. It could also be used to warn personnel of material that was overheated and take corrective actions automatically. The mobile application 600 would also allow quality control or quality assurance inspector to monitor the preheat and interpass temperatures with their mobile phones 200 or any computing device the application is installed on. The device 310 can alert the user if temperature does not meet the welding specification.

A GPS location module can be added to the device 310 to show where the measurements and calculations were performed. This functionality comes in handy when, for example, welds are being completed on oil pipelines. This function, for example, will allow for asset tracking to be sure no welds were missed. The Location can be stored and used for later review for traceability of the weld. If the measurements or calculations do not meet the requirements, the weld can be easily located. This can prevent loss of profits and can prove who the liable party is. The GPS module could also help prevent the device from being stolen. The GPS module can be used to be a theft deterrent and device recovery if lost or stolen. The device can show its location on a schedule set by the user. The device 310 could be deactivated or erased if sensitive information in its stored memory if the user choses. The GPS functionality would allow companies, as an example, to coordinate and automatically send personnel in the area the required information that it predicts would be useful for their task. The device's GPS gives the user the ability to create as-built drawings for each completed weld location and compile the completed welds as the project progresses. It can provide the user the location, altitude, and real time view of welding in progress. The device would store the GPS information of each weld and automatically create a document the shows the customer the completed project to ensure compliance in a specification and for future reference if corrective action is necessary.

Another embodiment will consist of the device 310 having a transmitter that a user (welder) would use to communicate with other welding personnel in the area to inform them of actions, updates or potential errors they are experiencing during the welding task. Examples of this would be: the welder could ask personnel for more welding consumables; the welder could tell personnel to change settings on the welding machine in order to stay within the specification or communicate with their welding partner since the welding shield blocks their face and makes them hard to understand while they speak.

Another embodiment will consist of a built in RFID reader and chip within the device 310. This will allow asset tracking of the device 310. The RFID reader would allow the device 310 to prevent unauthorized users from using the device 310, track the users who have used the device 310 or record the area the device 310 was used. The RFID could be set up to only let people who are authorized to use the device 310 and no one else by giving RFID chip emitters to each of the users. It can be set up to alert the company, lock or erase the data in memory when unauthorized personnel are tampering with it. When using the device 310, the authorized user would use the chip they are assigned to activate the device 310. The device 310 could then record the user who took the measurement into memory with the measured and calculated data. The device 310 would be able to record the area where the measurements and calculations were performed by having a stationary RFID device in the area where the device 310 or devices 310 are to be used. This would allow traceability of each different and separate weld. When a user device 310 would go into an area, the RFID chip reader would scan the stationary RFID chip and then the device 310 would then store information about the weld, welded material, welding station, consumables, devices in welding area, calibration dates, time and date stamps, personnel assigned to the area and expiration dates of the safety equipment assigned to the area. With use of "AI" deep learning technology, the device 310 could automatically categorize calibration dates on schedules, contact the company and set up calibration renewal schedules, maintenance schedules, personnel bonus recommendation from evaluation of the users of the device 310 and many other functions related to decisions made by detection and analysis.

In another embodiment, a laser distance meter would allow the user to measure horizontal or vertical distances without using the encoder wheel 18 or the internal measuring tape encoder as described in the main embodiment (FIGS. 1 thru 4 above). This will allow the user another way to take measurements depending on preference. With the added AI technology, the laser function could be used to calculate the pattern of measuring of each user and automatically take measurements with the laser meter. It could also review the measured lengths and alert the end user if they are congruent with predicted information. This will be ideal for large section being welded that the other encoder wheel 18 or internal measuring tape encoder would be impractical to use.

A user will use the laser distance meter to measure each pass deposition rate. The sensor is stationary and will manually or automatically measure the amount of weld metal that was deposited on each pass. The device 310 will use the preset value of the pipe diameter and calculate the weld length of each pass from the circumference formula. The user can measure the distance the welder started and finished from set distance from the weld and the device would calculate distance the welder welded using the Pythagorean Theorem and circumference formulas automatically.

It is important to note that the device 310 can track welder as they progress with an infrared temperature sensor and laser distance sensor. The auto track feature would consist of a base that can be secured with magnets or straps with motors that would allow movement on the x, y, and z axis. The device 310 would detect the radiated heat when the welder begins and would automatically aim the laser distance meter along the path the welder traveled. It would detect when the welder finished and automatically log the distance traveled that was calculated and log the heat of the weld while it was being welded. The heat input would be calculated using the heat it measured during the process and compare the calculated values to the device calculation. It can alert a user during weld progression if the calculated heat input from the instantaneous and average temperature being measured is not within the specification. The device 310 would display the travel speed, heat input and material temperature on its display and send the information to the energy weld device through cable or wirelessly with Bluetooth and Wi-Fi technology. The device 310 can check personnel temperatures in the area automatically which could be used to prevent spread of viruses.

LED lights will allow the end user to know when the device 310 is on, ready for taking measurements and calculations, show that the required preheat of the material being welded is met, show that the internal GPS is connected to the satellites, the internal Bluetooth module 6 is ready for pairing, connected or not connected, the internal WIFI module is ready for connection, connected or not connected.

An additional embodiment, the device 310 would have a headset or earpiece that clips or is built into the welding mask and interfaces with the device 310. The device 310 would relay information from the welding calculator to the welder through audio (sound transmitted through a cable, or through Bluetooth or Wi-Fi functionality previously mentioned). With the aforementioned "AI" technology enabled, the device 310 could have preset recordings that would inform the welder of the status of the weld or corrective actions that need to be taken in order for the weld to comply with the required parameters. The device 310 could verbally inform the welder of actions that needs to be performed to reach the desired results. The device 310 would also allow the welding calculator operator to talk to the welder directly. This would allow the welding calculator operator to inform the welder of many different things, but it will greatly increase the safety of the welding personnel. They could be informed of imminent dangers that they cannot observe while welding.

A built-in audio microphone in the device 310, would allow the device 310 to accept voice commands, input values or record notes. The user could verbally control and operate any feature on the device 310. For example, the user could say "start timer", "stop timer" etc. The device 310 could also accept verbal inputs. Once the user sees a value, they can speak the value into the microphone and the device 310 would save the value. For example, the user could say "80 Amps", "20 Volts", "Length 100 mm", etc. The values would be used for other calculations. The user could record notes whenever the user likes. The user could make verbal notes about the material being welded for traceability, weld numbers, safety hazards, etc. The verbal notes could be converted to text if the user choses. This functionality could use audio analytics and deep learning techniques to fit the need of the user. It could review the recorded audio for discontinuities and automatically alert the personnel or fix the problem itself. For example, if the device 310 records a possible erroneous value, it could alert the user to repeat. It could also warn the user if the measurement is correct but the calculated values from the data are not within a specific tolerance. It could be set to have full control of the system and give the user the necessary feedback when needed. The device 310 could also analyze the recorded information and alert the required personnel if the equipment or people's recorded audio in the area seems to have a problem.

The device 310 could have multiple laser interrupt sensors to measure length. This would allow end users of the device 310 to place multiple laser interrupt sensors parallel to the weld along the length of the weld from beginning to end. These sensors would be connected to the welding calculator with a cable or wirelessly. The distance between each sensor could be measured and used by the welding calculator. This would allow the welding calculator to calculate the length of the weld during and after the weld is completed. The weld data can then be calculated and used to predict end times and if the weld is not going to meet required parameters.

Having an Attachable fixed starting point mount with rotary encoder wheel 5 that attaches to the welding electrode head with a retractable cable to calculate length. This would measure the length of the weld as it progresses and after completion. The attachable starting point of this device 310 would have a rotary encoder spool and attaches to the welding electrode head. The welding electrode head would have a swivel to allow uninterrupted movement while welding. The cable would retract to the starting position and will have very slight tension on the cable to allow for ease of movement during welding and less erroneous length measurements. When the weld begins and progresses, the cable that is on the encoder spool is drawn out and it spins the encoder. The encoder would be connected to the welding calculator with a cable or wirelessly. The welding calculator will then use the data coming from the encoder to calculate the length of the weld. When the weld pass is completed, the cable would retract and spool back around the encoder spool 5 and would be ready for the next weld pass.

The device 310 could have an automatic categorization of weld passes. With the "AI" functionality installed (as previously disclosed), the welding calculator would allow the user to enter "Weld Pass" ranges so that the unit could store each weld pass to a specific category that its information was in. As an example, the Welding Calculator would name a pass that had an average voltage of 12-15 volts and Amperage of 100-150 amps the "Root pass 1" and the next pass would be called "Root pass 2" if it met the same criterial and would call the a pass that had an average voltage of 15-20 volts and amperage of 150-200 amps the "Hot pass 1". This would allow the end user to easily sort through current and saved data.

As shown in FIG. 5, the device 310 could have an automatic measuring tape dispenser 101. This addition would allow the device 310 to be operated with a single hand. The addition would consist of a small motor 102, a dispenser wheel 103 attached to it and an engagement mechanism 104 that will engage and disengage the device 310 when a button is pressed or released. The dispenser wheel 103 would have "clutch like" system in it that would be like a lawn mower pull start that would allow the user to pull the tape measure 5 while the dispenser motor 102 is engaged without damaging it. This system would let the tape measure 5 go only one way and it will only be able to dispense and not retract when it is engaged. When the device 310 is disengaged, the device 310 would allow the tape measure 5 to be retracted. With the use of "AI" technology, the device 310 could automatically dispense the measuring tape 5 to the approximate length it believes the end user would need to get a measurement. It would save time by increasing the speed of measurements.

Another additional function would be a magnetic wheel 106 that is fixed to the end of the measuring tape 5. This feature would allow the tape measure end to stay connected to the weld as the tape is being dispensed. This would be convenient for the end user when measuring flat or circular welds. On pipe welds, the end user would hold the device 310 with one hand and retrieve the tape measure end with the other hand when the tape comes around the pipe.

The device 310 could have a handle 26 (or handles) or wheels 25 on the device 310 that would allow the user to use the device 310 easily with one hand. The current design can be slightly difficult for the user to use. The handle 26 would be something that the end user can insert their hand into and would prevent the device 310 from slipping out of the user's hand. The handle 26 could be a strap or plastic structure on the end of the device 310.

Another embodiment the device 310 could have a Gas Detection Sensor 107. Welding shielding gas that leaks can be costly for the company and hazardous to personnel in the area it is leaking. This additional function would detect shielding gas leakage or detect other unwanted gases in the area. The Gas Detection sensor 107 would also be able to detect hazardous gases in the area other than the welding shielding gas. The Gas Detection sensor 107 would relay the information to the microcontroller 3 with a cable or wirelessly to the device 310. The microcontroller 3 would determine which gas that is present and alert the personnel. The data about the gas and time stamp would be saved to memory. The device 310 can then review the data from the sensor and even alert the authorities if the gas in the area is dangerous to prevent possible injury or death. It would automatically write and send noncompliance reports on the behalf of the customer to the company if the device 310 determines if they are liable for the problem.

The device 310 could have a heartrate monitor and oximeter 108. This would be built into the device, connect to the Welding Calculator with a cable or wirelessly as a separate device. It would allow for the monitoring of the welding personnel while working in extreme climates or potentially hazardous working conditions. The welding calculator can be set to illuminate LED lights 109 showing the conditions of the welder. If there is a problem, then a specific LED will illuminate and if conditions are in the desired range then a different LED will illuminate. Also, it can send data to the device 310 so it can record and store information about the personnel while the work is being performed. This apparatus (embodiment) can help companies prevent employees from working in unsafe environments too long. The data would help inform companies of the employee's working conditions and allow them to improve the conditions. It will protect the employees by recording and providing data that can be used against their employer if unacceptable working conditions were not improved in a reasonable amount of time and the personnel were injured or died. And with the "AI" technology enabled, it will allow the device 310 to review the data from the person that is being monitored. It can then can quickly determine if the personnel need medical attention and alert the proper parties using functionality previously disclosed (i.e.: Bluetooth, etc.). It can also determine if the personnel have underlying medical conditions and record the information to the personnel's file for future reference. It is able instruct the personnel of corrective action that could possibly correct a detected problem.

Another embodiment the device 310 can have gas flow meters 110. Gas flow meters 110 are used to measure the amount of shielding gas that goes to the weld while welding. This function would trigger an alert for end users and personnel if the gas flow rate is not in the required range during welding. The device 310, with this function enabled, could review the data from the meter and predict when the gas tanks will need to be refilled. It can alert end users or necessary personnel when the device 310 detects a leak. It could also instruct the end user of the optimal flow rate it calculates from the environmental conditions the device 310 measures from the other sensors.

The gas flow rate meter 110 will monitor and log the amount of gas each weld uses, and the type of gas used. Knowing the type of gas being used and amount of consumed, the user can predict how much shielding gas to purchase for a project and give better quotes on their services. It will increase safety by allowing the user to input the volume of an area that is being welded and the device 310 would inform the user what necessary area flow in that area is need to keep the shielding gas in the area below a deadly limit. This feature would also prevent welders from using the wrong shielding gas that could possibly reject a weld.

The gas flow rate meter 110 could be built in, or in the form of a $3^{rd}$ party apparatus that connects with a cable or transmit information wirelessly. The information would be stored to the device's memory or to a cloud-based server for later review.

Another embodiment would have temperature, humidity, and dew point sensors 111. This would allow the device 310 to monitor, record and save the temperature, humidity, and dewpoint of the area it is being used. It can be used for the coating process as well as used to warn personnel of a hazardous work environment if a preset threshold is met and then store the information to memory. With this function, the device 310 could be set to remind the coating personnel if the ambient weather conditions will cause a need for action to be taken with the surface preparation of material to be coated. And with the aforementioned "AI" technology enabled, the device 310 could use the information measured by the sensor to alert personnel of corrective actions that need to be taken. The device 310 could then also predict if the environment for welding consumables or equipment needs to be stored to prevent corrosion. The information could also be used to improve working conditions by calculating the ideal work schedules for the environment it is in.

Barcode reader and printer. The device 310 allows the user to scan welding equipment and the accessories in the area prior to welding. the user would scan the consumables, gas welding equipment, the part to be welded, and the device 310 would alert the user if any of the equipment or material is not within the welding specification prior to welding. it will allow the quality control department to make check list that can be filled out as the user scan the barcodes. It would be useful to maintain traceability. A quick scan would provide the user with the complete history of the parts to be joined: part number, heat number, and if the part is on hold or previously rejected. It will increase the speed and efficiency of the quality department's checks which will increase production speed. The device 310 would allow the user to print out barcodes for application to equipment and material. The Quality control personnel can scan the barcodes every day during their shift and have a record of compliance to the specification for the client. The quality control personnel can print a data "check list" showing the customer that everything was verified to be compliant with the agreed upon specification.

The device 310 can have a dry film thickness gage 112. This would allow the device 310 to check the thickness of a coated substrate. The film thickness gage 112 would display the data on the OLED screen 17, transmit wirelessly to a display 210 and or send data to a remote device 310 with a cable. The values would then be saved to memory or sent wirelessly to a cloud-based server. With the progression of "AI" and its deep learning abilities, the device 310 could use the information to predict low thickness patterns or help pinpoint the best coating application settings for the best coating thickness results. The device 310 could also show the best settings to achieve desired results with minimal material use. The device 310 could use review the data measured and recorded to predict the areas of the coating that are likely to be out of tolerance and suggest corrective actions that are likely to solve the problem. The data would be timestamped (and saved) and recommended maintenance schedules of the coating application equipment to prevent loss of downtime profits when the equipment breaks. It would automatically write and send noncompliance reports on the behalf of the customer to the company if the device 310 determines if they are liable for the problem.

The device 310, in an alternative embodiment could have salt test meter 113 with multiple timers. This would allow the device 310 to check the amount of salt on a substrate before coating is applied to the surface. The device 310 would consist of a salt test meter and at least three timers. The timers would allow testing of multiple samples at the same time. The results would be displayed on the OLED screen 17, sent by a cable to a display device 210 or sent wirelessly to a remote display device 118. The data of each measured sample would be time stamped and stored to the device's internal memory, sent with a cable to a storage device or sent wirelessly to an online cloud-based site for viewing (as previously documented). This would speed up testing and application times which would increase production speeds. With the "AI" enabled, the device 310 could review the measured data and predict if the stored material's salt levels are likely to be out of the desired levels and alert the necessary personnel. It could review the data of previous measured salt levels and detect if there is a pattern of unacceptable levels and find the source of the problem as well. This meter would then allow the device 310 to recommend corrective action to the necessary personnel for a resolution. It would also order the required products to resolve issues it detects automatically if the needed material is not on site. It would know which products are not on site by reviewing online inventory list. It would also change the items on site's item list when it detects changes in inventory. It would automatically link the salt levels to the manufacturer and the place the material came from. By having this data linked to the material, the company buying the material will know the quality of the material they are buying and or request the manufacture to resolve the salt level issues if the measured values are constantly out of range. The device 310 would then be able to automatically write and send non-compliance reports on the behalf of the customer to the company if the device 310 determines if they are liable for the problem.

The device 310, in an alternative embodiment, could be used to predict hardness of a specific weld. The device 310 could have the base metal and filler metal's properties stored. This information coupled with the thickness of the base metal, joint design, heat input, temperature of base metal before welding, and temperature of the surrounding environment could be used to find the thermal cycle by using Rosenthal equation. After thermal cycle is found with respect to time the Hollomon-Jaffe parameter can be used to predict hardness. With the hardness value known, the device would warn an inspector if the weld will cool too quickly. For example, if the surrounding temperature were extremely low, the device would advise the inspector to insulate the completed weld to slow the cooling rate. If the weld cooled too quickly, it could result in higher unacceptable hardness levels.

The device 310 could have a Holiday detector 114. This would allow the device 310 to check for small holes in coated substrate which are called holidays. The measured data would be displayed on the OLED screen 17, sent by a cable to a display device 210 or sent wirelessly to a remote display device 118 and or online cloud-based server. The information about the detected holiday would be stored to the device's memory, connected storage or transmitted wirelessly to and online cloud-based server. This would also have a buzzer to alert the user of a detected holiday. The Holiday detector 114 would have multiple attachments on itself to allow checking holidays on various coated substrates. The attachments will have multiple sections that would illuminate when a holiday is detected to pinpoint the approximate location of the detected holiday. With the "AI" technology enabled, the device 310 could review the data about the detected holidays and alert the user if the number of holidays detected are out of the required tolerance. It would timestamp (and record/save) each detection with the material information being tested, approximate locations of the holidays. The device 310 would analyze the data and determine if there is a pattern of the holiday locations. If it determines a consistent pattern, it will alert the necessary personnel and recommend corrective actions to alleviate the manufacturer's problem during production. The device 310 would compare the stored information to the required specification and automatically determine if the company or manufacture of the product is liable for the number of holidays that were detected. The device 310 would automatically write and send noncompliance reports on the behalf of the customer to the company if the device 310 determines if they are liable for the problem.

A Conductivity meter 115 would allow the device 310 to check the salt levels in abrasive materials used for blasting substrates for a service profile for coating application. The measured data would be displayed on the OLED screen 17, saved and sent by a cable to a display device 210 or sent wirelessly to a remote display device 118. The data of each measured sample would be time stamped and stored to the device's internal memory, sent with a cable to a storage device 310 or sent wirelessly to an online cloud-based site for viewing. With "AI" technology enabled, the device 310 could review the measured data and predict if the abrasive salt levels are likely to be out of the required levels and alert the necessary personnel. It could review the data of previous measured salt levels and detect if there is a pattern of unacceptable levels and find the source of the problem. The device 310, because of having this meter, would recommend corrective action to the necessary personnel for a resolution. The device 310 would also order the abrasive material automatically by reviewing online inventory list and calculating the amount of abrasive depleted daily to keep the inventory stocked. The device 310 would then be able to monitor the storage environment of the material and track batch numbers to prevent the company from using unacceptable abrasive. The device 310 would keep logs of manufacture date, storage environment and batch numbers for the company to be able to prove fault of the manufacture or company in the case of consistent unacceptable salt values and bad quality abrasive products. With all this data being readily available, the device 310 would automatically write and send noncompliance reports on the behalf of the customer to the company if the device 310 determines if they are liable for the problem.

The device 310 can have satellite data beam technology 116 for when cellular, broadband and or other internet connections are not available, the satellite beam will allow data to be sent and received through satellites.

The system and device 310 could have an automatic calculation of welding machine size needed from a given specification. This allows the user to input the welding specification for the material being welded. The device 310 would automatically calculate and inform the user of how much power, voltage, amperage, and duty cycle a welding machine will need to meet the specification requirements. The contractor could potentially save money and space by buying a machine that meets the requirement instead of buying a larger oversized welding machine.

The device 310 could have optional wire feed speed attachment 117. This addition would connect to a welding machine that has a filler metal fed through a nozzle that is on the tip of the welding handle as the welder welds. The speed of the wire can be used to calculate the travel speed of the welder as they weld. This speed could be used to help calculate the heat input or illuminate the need of the person to measure weld length traveled after welding. The wire speed attachment 117 can be connected to the device 310 with a cable, wirelessly with Bluetooth, cellular network card or wirelessly with Wi-Fi connection built into the optional wire speed attachment as well as the main device 310. The optional wire speed attachment 117 would consist of a wheel that turns as the wire is unspooled inside the device 310. It would be an attachment that could be attached or removed without harming the welding machine. The information measured with the optional wire speed attachment can be used, saved, and accessed through a cloud online storage service.

The device 310, in and as an alternative embodiment, could be used to find wire feed speed. By knowing the wire diameter, the wire feed speed can be calculated. For example, for 0.030-inch wire, the device user would multiply by 2 inches per amp to find the wire feed speed in inches per minute (ipm). By knowing the wire feed speed and deposition efficiency of the filler metal, the device 310 could calculate the actual amount of filler metal being deposited for every user. This information could be used to calculate cost of materials, evaluate welder's performance, and calculate weight of the material being deposited. All this information could be used to calculate the cost of projects.

The device 310 has a lightning detection sensor that will alert the personnel in the area that a storm lightning strike was near a user selected parameter. The device 310 would connect wirelessly with Bluetooth, Wi-Fi or mobile service providers to a weather station website that is nearby. When lightning strikes within a specific parameter the user selects, the machine would alert the personnel in the area with LED light displays and sound. The warning would be on the display for the personnel can read. The device 310 can use its internal components to measure the radio wave disturbances cause by lightning to warn the personnel in the area if wireless connectivity is not present. It would measure the radio waves in the area and if it detects any abnormal electromagnetic pulses that are congruent with lightning pulses, it will alert the user. The device 310 will save the results to its internal memory or online cloud service provider for review and future predictions.

The current invention would use the heat measured during the welding process to reverse calculate the energy that is entered into the weld. They would allow probes to be added to the material that measures the temperature while welding. The device 310 would record the values that are obtained with the temperature probes that are positioned across the material. The thermal coefficient of the material is entered into the device 310 and it then calculates the energy that the welded material is receiving to compare to the welding procedure. The user would have to input mass (m) of the material, specific heat capacity of the material (c), temperature of the environment around the material (T ambient temperature) and the materials temperature during welding (T steel temperature). The difference of the material and ambient temperature would give you the temperature differential ($\Delta T$). the following is the formula to calculate the energy transfer in joules:

$$Q = m * c * \Delta T$$

The metal is a homogeneous mixture so the following equation can be used to calculate the energy transferred to the material being welded as well.

$$QT = A * U * (Ts - Ta)$$

A is the surface area of the metal, U is the conduction property of the material, Ta is the ambient temperature around the material, Ts is the surface temperature of the material while welding and QT is the energy that is transferred to the material during welding. This allows the user to place multiple temperature probs throughout the material being welded to track welding speed and instantaneous energy input into the material. The user can review each section the probes are placed to see if the heat input is within the specification. The user would enter the weld length so the device 310 can calculate the travel speed, heat input and instantaneous energy input. The data can be compared to the energy calculated from the device 310 using the other method. The results would be displayed on the OLED screen 17, sent by a cable to a display screen 210 or sent wirelessly to a remote display device 118. The information would be stored to the device memory or to a cloud-based server for later review.

The device 310 can use its internal components to predict weather events that might occur. The device 310 uses the temperature, humidity, windspeed, emp detection and doppler radar sensors to measure and environmental conditions in the area and calculate the percent chance of a weather event to occur. Once the device 310 calculates the percent chance, the device 310 would alert the user if the user preset percentage threshold is met. The device 310 will show the measurements obtained from the sensors if the user choses. The device can connect to a local weather service with a cable or wirelessly through Wi-Fi, Bluetooth or mobile networks to obtain weather condition near the user. The device 310 will alert the user if the local weather station environmental condition predictions met a user preset threshold value. The device 310 will alert the user with LED light displays, buzzer or displayed on the screen. The device 310 will save the results to its internal memory or online cloud service provider for review and future predictions.

The device 310, in and as an alternative embodiment, can monitor personnel for underlying health conditions and prevent the spread of viruses when the device discovers a person has a contagious condition or life threating condition. It would use, as examples, personal temperature, heartrate, blood pressure and blood oxygen monitors to record the data and verify the user's health while working on and off the job site. It will record the person who has a possible infectious condition and alert the proper personnel about other people that might have encountered the infectious person. It will keep a log and alert the user if the readings are unsafe or if it loses a connection to the sensors. The device can provide health care providers a list of the recorded vitals to achieve a faster diagnosis. The user would have the option to have the device automatically call emergency personnel. The device has a feature to alert the proper authorities if the user feels threatened by environmental conditions, wildlife, and human assailants. It would document and record the events that are taking place when the user activates this feature.

Another embodiment the device 310 has is a feature that can be used to prevent infectious diseases to be pass on to another host. The user would have a sensor that is around their wrist and one that can me clipped on to a shirt or hat. When the sensors pass a certain preset distance threshold, the device will alert the user to increase the distance between the two sensors. This would be used to prevent personnel from touching their face during a pandemic to prevent an increase in infected people. The sensors can be used on other object that are common to carry pathogens. The user can place the sensor close to doorknobs and other common infections objects and the user would be warned to clean hands after touching when they cross a preset distance threshold of the other sensor.

Another embodiment the device 310 can be used for is during research and product development. In this use case the device 310 would be used to produce a specific welding specification. These are used as a guideline for developing a procedure which comes from research and development to produce a suitable weld for the client. The user would connect the device 310 to the welding machine and monitor the welding process during the research and development phase. The weld produced would then be tested. When the weld is accepted, the data recorded during the research and development phase would be used to produce the proposed welding procedure specification. The device 310 would automatically input the ranges the welding voltage, amperage, travel speed, gas flow, wire speed and heat input into the proposed procedure and stored into the device's memory. The device 310 will then instruct the user what ranges to set the equipment during the qualification processes. It will monitor the entire process and alert the user if any of the requirements are not meet. The device can send the data through a cable or wirelessly with Wi-Fi and Bluetooth (as previously described) to other devices and to an online cloud service for future review. The device 310 can compare the data recorded to ultrasonic testing, x-ray, and visual inspection results. It will find the were the voltage, amperage, travel speed, wire speed and heat input isn't consistent and compare the results to the destructive and none destructive testing after weld completion and then saving it to an online service with a cable, wirelessly through Bluetooth and Wi-Fi or on another device. The device 310 will use the data to predict if the weld is rejected or acceptable using variations in the recorded data during welding to save testing cost and speed up the process. The device would alert the user about a potential weld rejection while welding so the personnel can fix the possible problem.

The device 310, in and as an alternative embodiment, could have a remote 700 that is connected remotely with Wi-Fi, Bluetooth or cable that would control the dials on a remote welding machine. This alternative embodiment-based device could consist of a remote that a welder has in his hand or attached to the welding wand and would connect to a separate device that is places on the welding machine dials or knobs. The device that connects to the knobs would have a motor that spins the dial or knob when it is directed to by the remote the welder has. The device 310 welder would then press a button that would increase or decrease the voltage or amperage settings on the welding machine before, after or during the welding process to meet the desired settings.

CONCLUSION

Although the present invention has been described in considerable detail with reference to certain preferred versions thereof, other variations are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles and functions of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:
1. The current invention is a device comprising:
a welding calculator having a screen, time counter, optical rotary encoder, voltage meter, split core amperage meter and a microcontroller with electronic memory, having a wireless module, where the time counter being part of the microcontroller programed to record the amount of time from the beginning to the end of a weld pass using the voltage meter to calculate the input voltage, a hall effect sensor to measure/calculate amperage, where the optical rotary encoder has a shaft with a measuring tape connect the shaft and uses a photo detector to detect when the shaft is rotated, having a reset button, having a three-position toggle switch with two positions to edit time and length values and a position to view saved memory values, where the optical rotary encoder has a shaft with a tape measure coiled around the shaft where the optical rotary encoder's shaft spins when the tape measure is pulled out and the optical rotary encoder transfers the shaft rotation to an electrical output allowing the microcontroller to measure length, time, amperage, and voltage calculating the travel speed and heat input, a start/stop button to start and stop the time counter, and an on/off button.
2. A process comprising:
performing welding calculations using the device of claim 1.

* * * * *